United States Patent
Miyata

(10) Patent No.: US 9,338,327 B2
(45) Date of Patent: May 10, 2016

(54) IMAGE PROCESSING DEVICE

(71) Applicant: KYOCERA Document Solutions Inc., Osaka (JP)

(72) Inventor: Mitsuko Miyata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/691,723

(22) Filed: Apr. 21, 2015

(65) Prior Publication Data
US 2015/0312443 A1    Oct. 29, 2015

(30) Foreign Application Priority Data

Apr. 23, 2014  (JP) .................................. 2014-088936

(51) Int. Cl.
*H04N 1/60* (2006.01)

(52) U.S. Cl.
CPC ........... *H04N 1/6066* (2013.01); *H04N 1/6002* (2013.01)

(58) Field of Classification Search
None
See application file for complete search history.

(56) References Cited

U.S. PATENT DOCUMENTS

| | | | | |
|---|---|---|---|---|
| 6,731,788 B1* | 5/2004 | Agnihotri | ......... | G06F 17/30796 194/206 |
| 2008/0240572 A1* | 10/2008 | Hoshii | .............. | G06F 17/30256 382/190 |
| 2011/0304894 A1* | 12/2011 | Okano | ..................... | H04N 1/40 358/530 |
| 2014/0132969 A1* | 5/2014 | Tanaka | ..................... | H04N 1/54 358/1.6 |

FOREIGN PATENT DOCUMENTS

| | | | |
|---|---|---|---|
| JP | H09-098302 A | 4/1997 |
| JP | 2004-242106 A | 8/2004 |

* cited by examiner

*Primary Examiner* — Mohammad Ghayour
*Assistant Examiner* — Christopher D Wait
(74) *Attorney, Agent, or Firm* — Studebaker & Brackett PC

(57) ABSTRACT

A reproduction color storing section stores pieces of color information in association with a color range that is stored in a color range storing section and includes a fluorescent color targeted for detention. Each piece of color information specifies a reproduction color candidate usable for reproducing the fluorescent color. The pixel extracting section extracts, from image data, a pixel having the fluorescent color based on the color range. A display control section reads, from the reproduction color storing section, the pieces of color information corresponding to the fluorescent color of the extracted pixel and displays the reproduction color candidates specified by the pieces of color information on a display section. The reproduction color receiving section receives a reproduction color selected by a user from the displayed reproduction color candidates. The fluorescent color reproducing section replaces color information of the extracted pixel with color information specifying the received reproduction color.

4 Claims, 12 Drawing Sheets

IMAGE PROCESSING DEVICE

INCORPORATION BY REFERENCE

The present application claims priority under 35 U.S.C. §119 to Japanese Patent Application No. 2014-088936, filed Apr. 23, 2014. The contents of this application are incorporated herein by reference in their entirety.

BACKGROUND

The present disclosure relates to image processing devices that detect a fluorescent color from image data and replaces the fluorescent color with a designated color.

In general, recent image forming apparatuses, such as copiers and multifunction peripherals, support color printing. Such a color image forming apparatus implements color printing through, for example, the combined use of recording agents, such as toners or inks, of four different colors, namely cyan (C), magenta (M), yellow (Y), and black (K).

The color image forming apparatus may not be able to reproduce colors of high brightness and high chromaticity as being outside of the range of colors reproducible by the apparatus. For example, the background color of a color document that is not perfect white is recognized as white, if the background color has high brightness and high chromaticity.

Some documents may be marked with fluorescent colors using highlighter pens or the like. Fluorescent colors often have high brightness and high chromaticity, and typical image forming apparatuses as described above may be unable to appropriately reproduce the fluorescent colors in print. In view of the above, suggestions have been made for image forming apparatuses provided with an image forming mode specifically for reproducing fluorescent colors.

For example, one known image processing device extracts regions in a fluorescent color from a document image with the use of ultraviolet radiation and replaces the fluorescent color with an approximate color included in the range of reproducible colors stored in advance.

Another known image processing device determines whether or not an image contains a fluorescent color based on pixel-by-pixel input image data and lowers the gain settings for the shading correction than in a normal mode.

SUMMARY

An image processing device according to the present disclosure includes the functional units described below. The present disclosure is directed to an image processing device that detects a fluorescent color from image data and replaces the fluorescent color with a designated color. The image processing device according to the present disclosure includes a color range storing section, a reproduction color storing section, a pixel extracting section, a display control section, a reproduction color receiving section, and a fluorescent color reproducing section. The color range storing section stores a color range including a fluorescent color targeted for detection. The reproduction color storing section stores, in association with the color range, a plurality of pieces of color information each specifying a reproduction color candidate usable for reproducing the fluorescent color included in the color range. The pixel extracting section extracts from the image data a pixel having the fluorescent color based on the color range stored in the color range storing section. The display control section: reads, from the reproduction color storing section, the plurality of pieces of color information corresponding to the fluorescent color of the pixel extracted by the pixel extracting section; and displays the reproduction color candidates specified by the respective read pieces of color information on a display section. The reproduction color receiving section receives a reproduction color selected by a user from among the plurality of reproduction color candidates displayed on the display section. The fluorescent color reproducing section replaces color information of the pixel extracted by the pixel extracting section with color information specifying the reproduction color received by the reproduction color receiving section.

DETAILED DESCRIPTION

The following describes an embodiment of the present disclosure in detail with reference to the accompanying drawings. In the following description, the image processing device according to the present disclosure is a digital multifunction peripheral 100.

Figure 1:
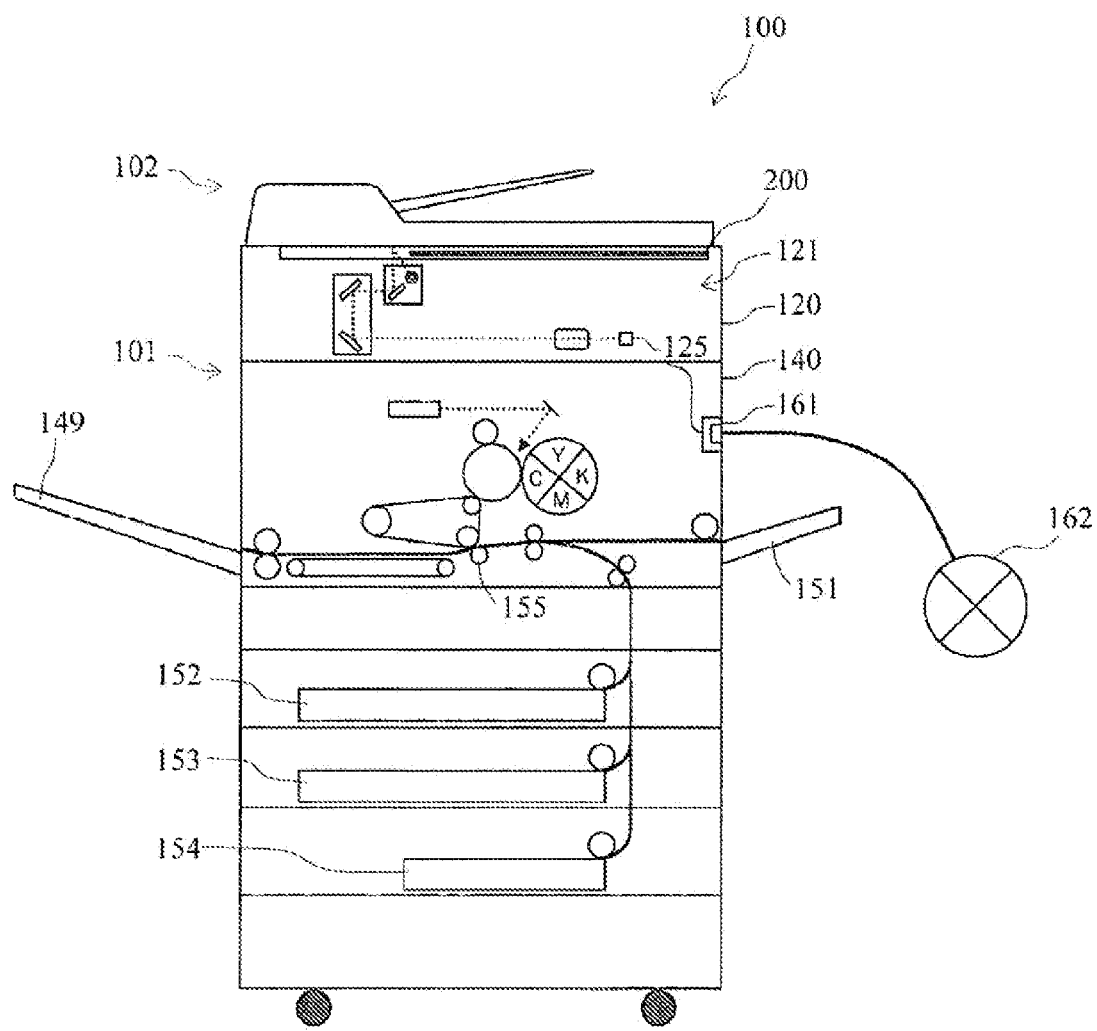
FIG. 1 shows an overall structure of a multifunction peripheral according to an embodiment of the present disclosure.

FIG. 1 shows the overall structure of the digital multifunction peripheral 100 according to the present embodiment. As shown in FIG. 1, the multifunction peripheral 100 includes a main body 101 and a platen cover 102. The main body 101 includes an image reading section 120 and an image forming section 140. The platen cover 102 is disposed above the main body 101. The multifunction peripheral 100 is provided with an operation panel 200 at the front. The operation panel 200 is used by a user to input a copy start instruction or other instructions to the multifunction peripheral 100 or to confirm the status or settings of the multifunction peripheral 100.

The image reading section 120 is disposed on the top of the main body 101. The image reading section 120 generates image data. More specifically, the image reading section 120 includes a scanning optical system 121 to read an image of a document and generates digital data (image data) of the read image. The scanning optical system 121 includes a line image sensor 125. The line image sensor 125 generates image data for each color of, for example, red (R), green (G), and blue (B) from an image of light incident on the photo-receiving surface. The thus generated image data is printed on a sheet by the image forming section 140. The image data may be transmitted to another device over a network 162 through a network adapter 161.

The image forming section 140 prints, on a sheet, image data generated by the image reading section 120 or received from another device (not shown) connected to the network 162. The image forming section 140 feeds sheets one at a time from a manual feed tray 151 and paper feed cassettes 152, 153, and 154 to a transfer section 155 where a toner image is transferred to the sheet. The transfer section 155 transfers a toner image to a sheet and discharges the sheet to an exit tray 149.

Figure 2:
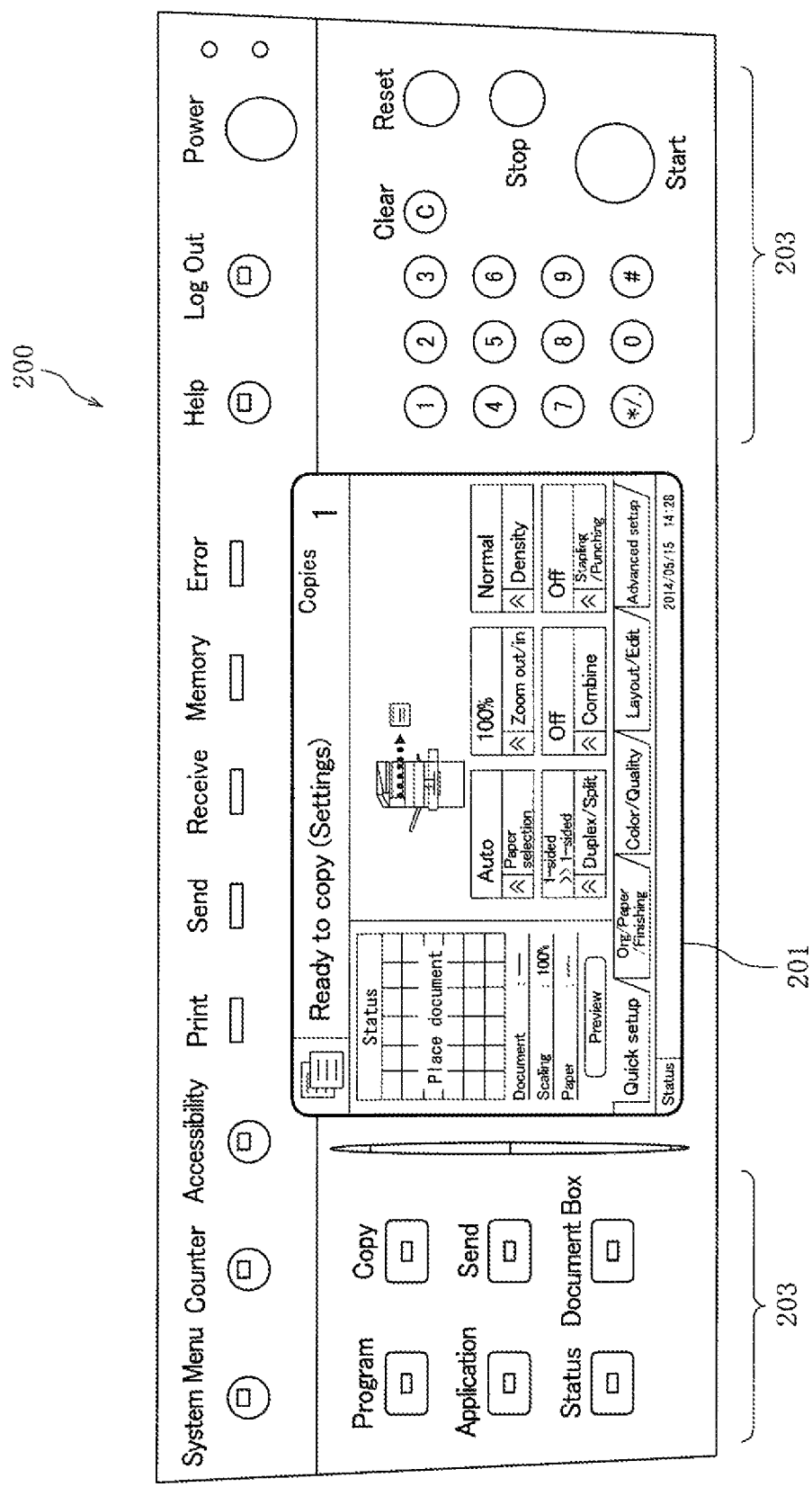
FIG. 2 shows an operation panel of the multifunction peripheral shown in FIG. 1.

FIG. 2 shows an example of the appearance of the operation panel 200 included in the multifunction peripheral 100. The operation panel 200 is used by a user to input a copy start instruction or other instructions to the multifunction peripheral 100 or to confirm the status or settings of the multifunction peripheral 100. The operation panel 200 includes a touch-sensitive display 201 and operation keys 203. The display 201 is provided with a liquid-crystal display screen for displaying operation buttons, messages, and the like and a touch-sensitive panel for detecting a pressed position on the display screen. The scheme for detecting a pressed position is not specifically limited, and may be any of those exploiting resistive films, electric capacitance, surface acoustic waves, electromagnetic waves, and so on. The user makes input on the display 201 by a touch with the user's finger, for example.

Figure 3:
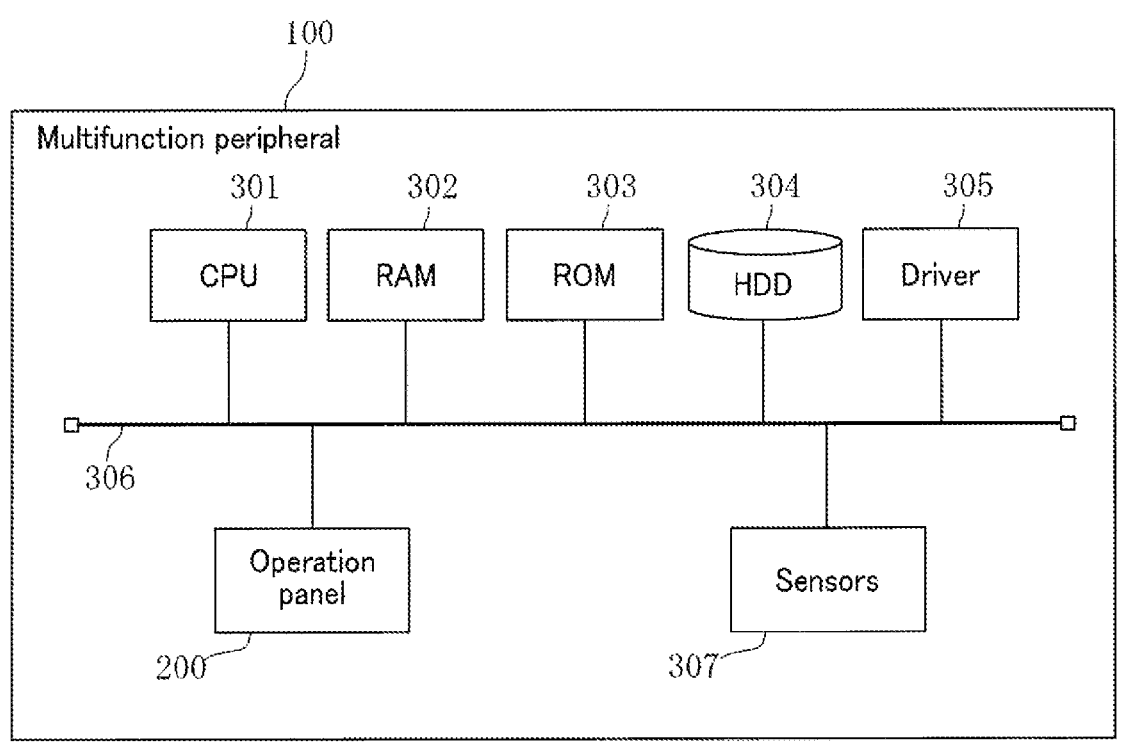
FIG. 3 shows a hardware configuration of a control system of the multifunction peripheral shown in FIG. 1.

FIG. 3 shows the hardware configuration of the control system of the multifunction peripheral 100. The multifunction peripheral 100 shown in FIG. 100 includes a central processing unit (CPU) 301, a random access memory (RAM) 302, a read only memory (ROM) 303, a hard disk drive (HDD) 304, and a driver 305 all of which are connected through an internal bus 306. The driver 305 implements the driving section for the image reading section 120 and the driving section for the image forming section 140. The ROM 303 or the HDD 304 stores a control program. The CPU 301 controls the multifunction peripheral 100 according to instructions issued by the control program. For example, the CPU 301 controls the respective drive sections by using the RAM 302 as a work area and transmitting data and instructions to and from the driver 305. The HDD 304 is also used to store image data acquired by the image reading section 120 and image data received from another device over the network 162.

The internal bus 306 is also connected to the operation panel 200 and sensors 307. The operation panel 200 receives a user's operation and issues a signal responsive to the operation to the CPU 301. The display 201 presents an operation screen according to a control signal from the CPU 301. The sensors 307 include various sensors, such as a sensor for detecting the opening and closing of the platen cover 102, a sensor for detecting a document placed on a document table, a temperature sensor of a fixing device, and a sensor for detecting a sheet or document being conveyed.

The CPU 301 implements the following sections (functional units) through execution of the control program stored, for example, in the ROM 303, and controls operations of the respective functional units according to signals from the sensors 307.

Figure 4:
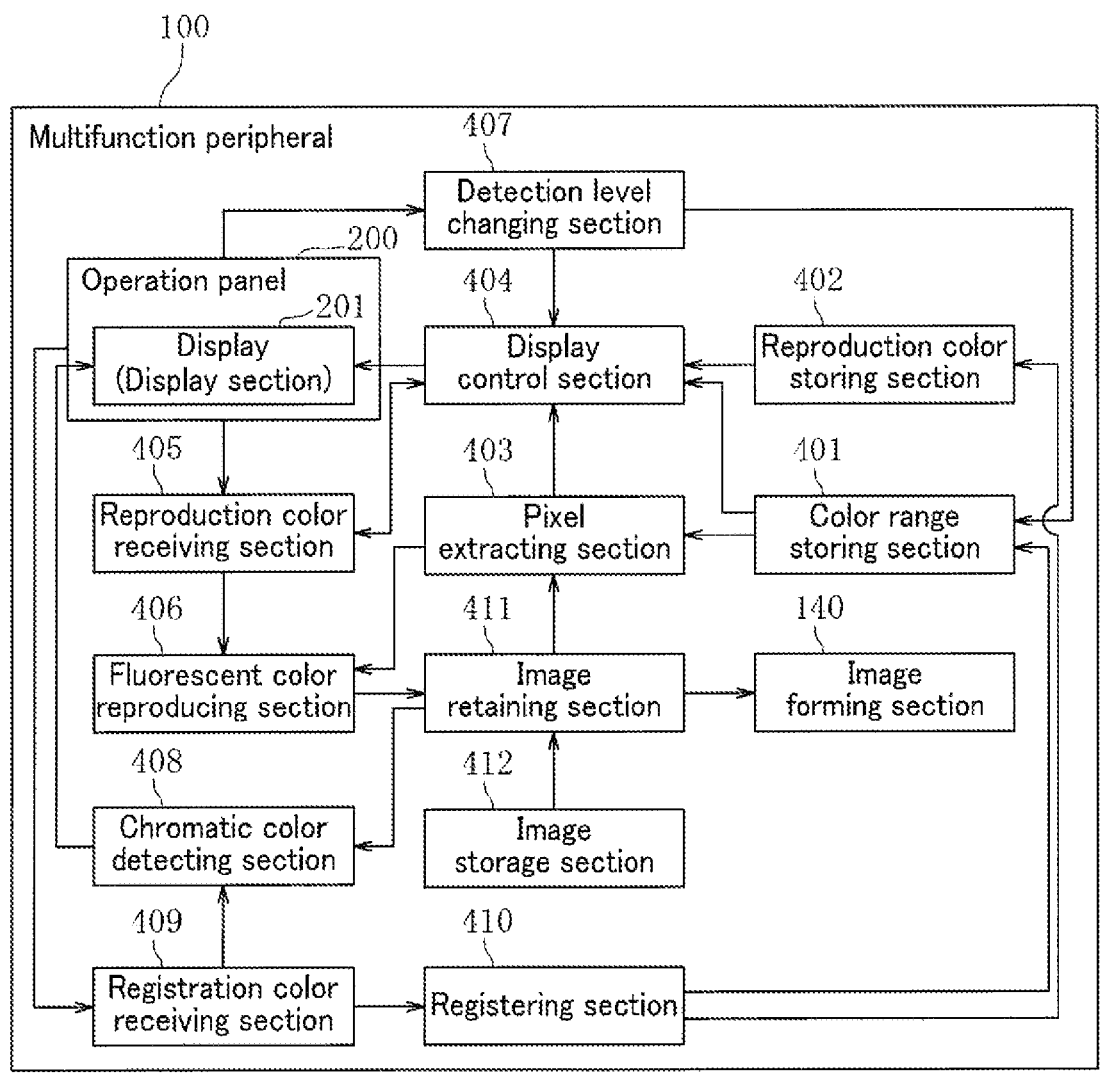
FIG. 4 is a block diagram of functional units of the multifunction peripheral shown in FIG. 1.

FIG. 4 is a block diagram of functional units of the multifunction peripheral 100 shown in FIG. 1. As shown in FIG. 4, the multifunction peripheral 100 according to the present embodiment includes the following functional units: a color range storing section 401, a reproduction color storing section 402, a pixel extracting section 403, a display control section 404, a reproduction color receiving section 405, a fluorescent color reproducing section 406, an image retaining section 411, and an image storage section 412.

The image retaining section 411 temporarily retains image data subjected to detection of fluorescent colors. Image data retained by the image retaining section 411 is acquired from the image storage section 412, for example. The image storage section 412 is a storage area of the HDD 304 and stores image data input from the image reading section 120 as well as image data input from an external device over the network 162. In an alternative configuration, the image data input from the image reading section 120 and the image data input from an external device via the network 162 may be stored directly into the image retaining section 411.

The color range storing section 401 stores one or more color ranges each including a fluorescent color targeted for detection. The color ranges may be defined based on any color system including the following. In addition to the XYZ color system, examples of color systems that may be usable include the L*a*b* color system, and the L*u*v* color system. A color range defines a color occupying a certain region in the color space in a specific color system. For example, a color range may be defined by a combination of color information specifying a specific color and a predetermined color difference. The color difference may be RGB difference data, ΔE*ab, ΔE00, or the like, depending on the color system used. In the present embodiment, the image data contains color information described in terms of the color components constituting the absolute color space, such as sRGB (standard RGB). As needed, the image data is readily convertible into a representation based on any other color system. When the image data contains color information described in the RGB color system, which is device dependent, the multifunction peripheral 100 converts the image data into color information represented in the absolute color space.

The color ranges stored in the color range storing section 401 are not specifically limited in number and other aspect as long as the color ranges do not overlap with one another in the color space. For example, a plurality of color ranges of different hues can be registered in the color range storing section 401. Also, a plurality of color ranges of the same hues can be registered in the color range storing section 401. In the present embodiment, the color range storing section 401 stores a list of color ranges used to detect fluorescent colors, as will be described later. The color ranges contained in the list represent detectable fluorescent colors.

The reproduction color storing section 402 stores, for each color range stored in the color range storing section 401, a plurality of pieces of color information each specifying a reproduction color candidate. The multifunction peripheral 100 can use the reproduction color candidates to reproduce the color included in the corresponding color range stored in the color range storing section 401 when printing or when generating print data that is for printing by another image forming apparatus. In the present embodiment, each color range stored in the color range storing section 401 is associated with a plurality of reproduction color candidates. A user can select any of the plurality of reproduction color candidates as a reproduction color to be used. The reproduction colors can be any color within a range of colors reproducible (printable) on a sheet by the image forming section 140. For example, a color of the same hue as a fluorescent color targeted for detection is usable as an appropriate reproduction color for the fluorescent color. Also, a color of a different hue from the fluorescent color is also usable as an appropriate reproduction color. Reproduction colors can be selected in advance by a user on, for example, a color palette presented on the display 201 and registered in association with a corresponding color range.

The pixel extracting section 403 extracts, from image data, pixels each having a fluorescent color based on the color ranges stored in the color range storing section 401. In the present embodiment, the pixel extracting section 403 extracts, from image data retained in the image retaining section 411, pixels each having any color included in the color ranges stored in the color range storing section 401.

The display control section 404 reads from the reproduction color storing section 402 a plurality of pieces of color information specifying the respective reproduction color candidates corresponding to the fluorescent color of each pixel extracted by the pixel extracting section 403, and displays the colors specified by the respective read pieces of color information on the display section. In the present embodiment, the display section is implemented by the display 201. As described above, in the present embodiment, a plurality of reproduction color candidates are designated for one color range. The display control section 404 simultaneously displays the plurality reproduction color candidates on the display 201.

The reproduction color receiving section 405 receives a reproduction color selected by the user from among the plurality of colors presented on the display 201, which functions as the display section. The selection is received on the operation panel 200, for example. In the present embodiment, the reproduction color receiving section 405 receives a reproduction color selected 201 by the user on the touch sensitive display.

The fluorescent color reproducing section 406 replaces color information of a pixel extracted by the pixel extracting section 403 with color information specifying the reproduction color received by the reproduction color receiving section 405. The replacement is applied to the image data retained in the image retaining section 411. The image data resulting from the replacement is printed by the image forming section 140. Alternatively, the image data may be stored into the image storage section 412 and used for printing by another image forming apparatus. Alternatively, the image data may be transmitted to an external device over the network 162 (see FIG. 1).

The multifunction peripheral 100 additionally includes a detection level changing section 407. As will be described below, the color range storing section 401 stores a plurality of color ranges that are adjacent to one another in the color space. This makes it possible to change the level of fluorescent color detection performed by the detection level changing section 407. The detection level changing section 407 changes the color ranges of fluorescent colors targeted for detection by selecting, from among the plurality of ranges stored in the color range storing section 401, one or more color ranges to be used for the pixel extraction by the pixel extracting section 403. In the present embodiment, the color range storing section 401 stores a list of color ranges used for the pixel extraction by the pixel extracting section 403. The pixel extracting section 403 selects the color ranges to be used for the pixel extraction by the pixel extracting section 403, by changing the color ranges included in the list.

For example, the color range storing section 401 stores a color range X corresponding to fluorescent yellow and color ranges Y and Z each adjacent to the color range X in the color space. The color range Y corresponds to fluorescent yellow more faint than that in the color range X, whereas the color range Z corresponds to fluorescent yellow more intense than that in the color range X. In the state where the user has not made an instruction to change the detection level, the color range list includes the color ranges X and Z, for example. Therefore, the pixel extracting section 403 does not extract any pixel having a color included in the color range Y. To enable extraction of a fluorescent color more faint than that in the color range X, the user makes input on the operation panel 200 to instruct the detection level changing section 407 to add the color range Y. In response, the detection level changing section 407 adds the color range Y to the color range list described above. In this manner, the pixel extracting section 403 is set to extract pixels having a color included in the color range Y.

On the other hand, to enable extraction of only an intense fluorescent color in the state where the initial detection level has not been changed, the user makes input on the operation panel 200 to instruct the detection level changing section 407 to delete the color range X. In response, the detection level changing section 407 deletes the color range X from the color range list described above. In this manner, the pixel extracting section 403 only extracts pixels of the colors included in the color range Z, leaving pixels of the colors included in the color range X unextracted.

Figure 5:
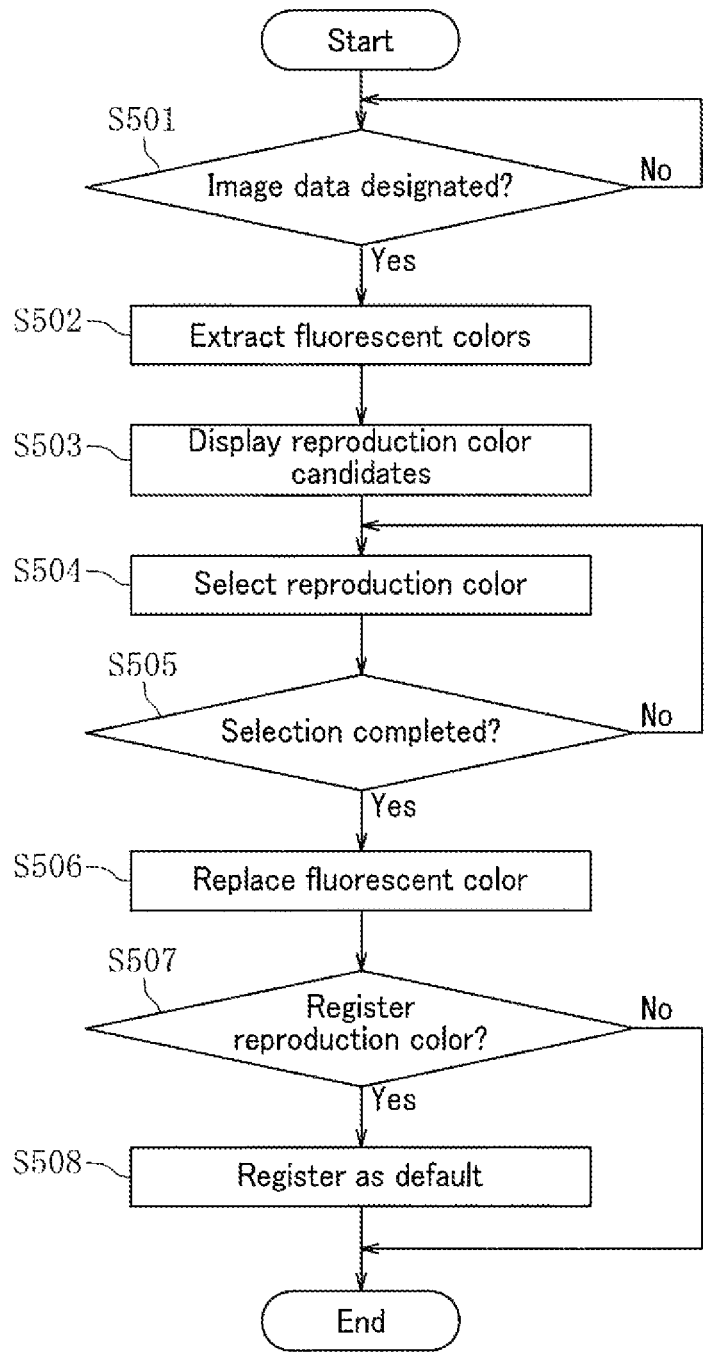
FIG. 5 is a flowchart of one example of a reproduction color selection procedure performed by the multifunction peripheral shown in FIG. 1.

FIG. 5 is a flowchart of one example of a reproduction color selection procedure performed by the multifunction peripheral 100. The procedure initiates in response to user's input made on the operation panel 200 for instructing execution of the "fluorescent color mode". As compared with normal-mode image processing, the image formation processing in the "fluorescent color mode" more appropriately reproduces, in print, fluorescent colors which are typically reproduced in an extremely faint color or white. In response to the execution instruction for the "fluorescent color mode", the multifunction peripheral 100 detects fluorescent colors from the image data based on the color ranges stored in the color range storing section 401. In this mode, the fluorescent colors are more reliably detected than in the normal-mode image processing.

Once the procedure begins, the multifunction peripheral 100 (for example, the image retaining section 411) presents on the display 201 a screen prompting the user to designate image (Step S501). Then, the multifunction peripheral 100 waits until the user completes the designation of image data (Step S501: No). The user designates the image data that is to be subjected to the fluorescent color detection. The scheme employed for designating image data is not specifically limited. For example, to designate image data stored in the image storage section 412 as image data subjected to the fluorescent color detection, a list of pieces of image data stored in the image storage section 412 may be presented on the display 201. This allows the user to designate a specific piece of image data to be read. The piece of image data thus designated is read from the image storage section 412 and retained in the image retaining section 411.

Image data read by the image reading section 120 may also be subjected to the fluorescent color detection. In this case, the user sets a document to be subjected to the fluorescent color detection to the multifunction peripheral 100 and instructs the multifunction peripheral 100 to start reading. The image data read by the image reading section 120 in this way is retained in the image retaining section 411. The image data retained in the image retaining section 411 may correspond to a plurality of pages. Yet, the description below is directed to an example in which the image data corresponds to a single-page document.

On completion of the image data designation (Step S501: Yes), the pixel extracting section 403 extracts, from the image data retained in the image retaining section 411, pixels having any of the fluorescent colors based on the color ranges stored in the color range storing section 401 (Step S502). The pixel extracting section 403 notifies the display control section 404 of the extraction result. Upon receipt of the notification, the display control section 404 reads from the reproduction color storing section 402 a plurality of pieces of color information each specifying a reproduction color candidate for the fluorescent color of each pixel extracted by the pixel extracting section 403, and presents on the display 201 the colors specified by the respective read pieces of color information (Step S503).

The display control section 404 notifies the reproduction color receiving section 405 that the reproduction color candidates are displayed. In response to the notification, the reproduction color receiving section 405 accepts user's input selecting a reproduction color (a change of a reproduction color from the default settings) until a reproduction execution instruction is input by the user (Step S505: No).

Figure 6:
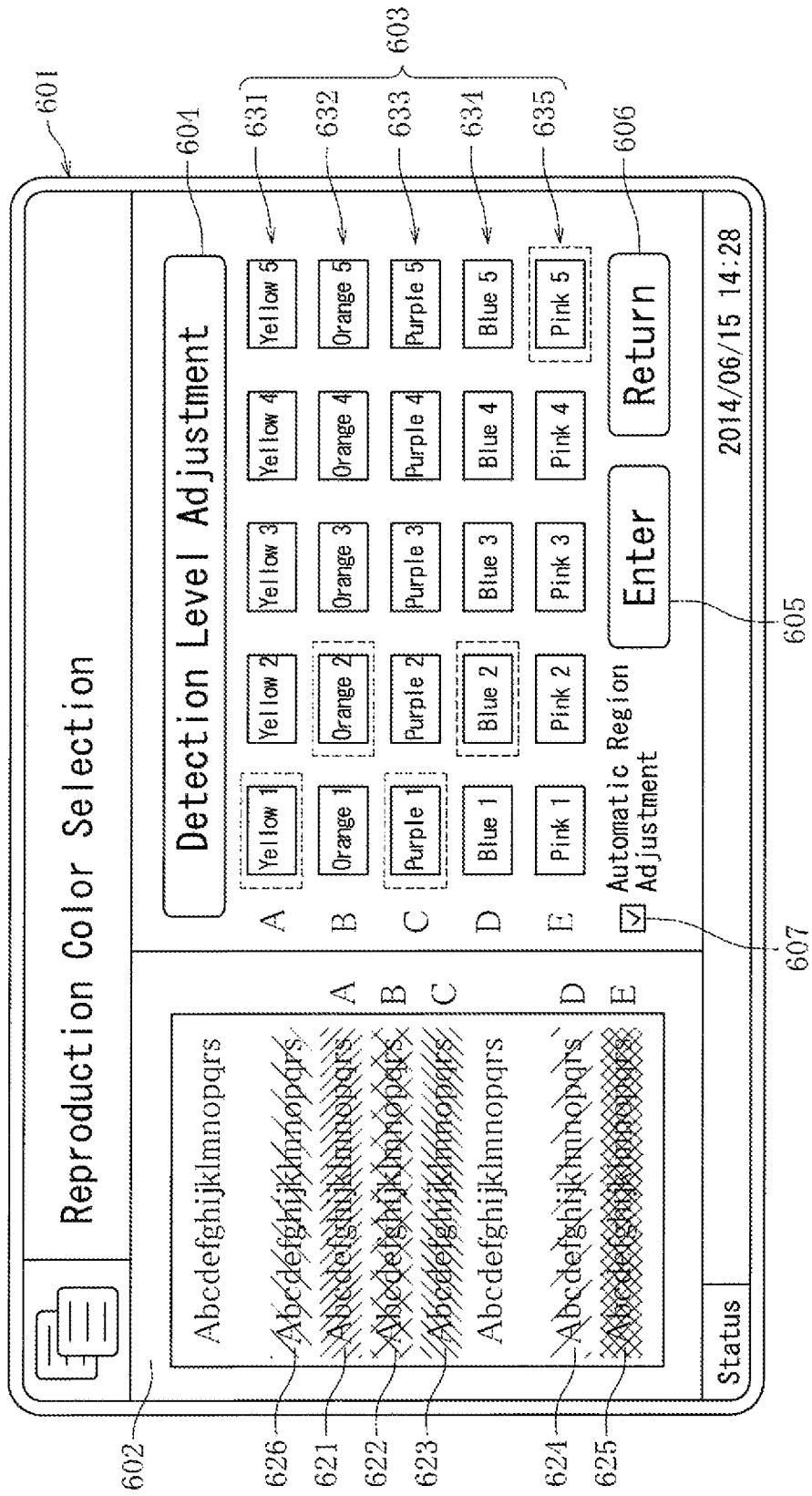
FIG. 6 shows one example of a reproduction color selection screen displayed by the multifunction peripheral shown in FIG. 1.

FIG. 6 shows one example of a reproduction color selection screen 601 displayed on the display 201 in Step S504. In the example, the reproduction color selection screen 601 includes a detection result display area 602 and a reproduction color selection area 603. The detection result display area 602 is used to display fluorescent colors detected by the pixel extracting section 403 from the image data. The reproduction color selection area 603 is used to display reproduction color candidates and also to select a reproduction color. In the present embodiment, the reproduction color selection area 603 displays a plurality of "reproduction color selection" buttons each colored in a different reproduction color candidate. The reproduction color selection screen 601 additionally includes an "Enter" button 605, a "Return" button 606, and a "Detection Level Adjustment" button 604. The "Enter" button 605 is used to enter the selection of a reproduction color. The "Return" button 606 is used to cancel the reproduction color selection and return to the designation of image data. The "Detection level adjustment" button 604 is used to execute the procedure of changing the detection level by the detection level changing section 407. The reproduction color selection screen 601 additionally includes a checkbox 607 for enabling or disabling the automatic region adjustment, which will be described later.

In FIG. 6, the pixel extracting section 403 detects five fluorescent colors having different hues (for example, yellow, orange, purple, blue and pink). The reproduction color selection area 603 displays five reproduction color candidates for each of the five fluorescent colors detected by the pixel extracting section 403. As shown in FIG. 6, the detection result display area 602 displays a preview image of the image data. In this example, the image data includes the fluorescent colors 621, 622, 623, 624, 625, and 626 included in mutually different color ranges. In the example shown in FIG. 6, the image regions in the fluorescent colors are indicated by hatched patterns.

In this example, the pixel extracting section 403 extracts the fluorescent colors 621 to 625 each as a fluorescent color. A region name is assigned to each image region detected by the pixel extracting section 403 as having a fluorescent color. In this example, alphabet letters are used as the region names assigned. In FIG. 6, the image region in the fluorescent color 621 is designated as a "region A", the image region in the fluorescent color 622 is "region B", the image region in the fluorescent color 623 is "region C", the image region in the fluorescent color 624 is a region D, and the image region in the fluorescent color 625 is a region E. Note that the fluorescent color 626 included in the image data is not extracted by the pixel extracting section 403 (as being outside the color ranges targeted for detection).

The reproduction color selection area 603 displays a set of five reproduction color candidates in a lateral row, for each of the fluorescent colors detected by the pixel extracting section 403. The respective sets of five reproduction color candidates form candidate groups 631, 632, 633, 634, and 635. In this example, since the five fluorescent colors are detected, the five candidate groups 631 to 635 for the respective fluorescent colors are displayed in a vertical row (in the order of the regions A, B, C, D, and E). In this example, the color of the region A is fluorescent yellow, the color of the region B is fluorescent orange, the color of the region C is fluorescent purple, the color of the region D is fluorescent blue, and the color of the region E is fluorescent pink. For the convenience sake, FIG. 6 shows each reproduction color candidate by the name of the color appended with a number on the right, such as "Yellow 1" or "Yellow 2".

When the user selects one of the reproduction color candidates displayed for each of the fluorescent colors (reproduction color selection buttons) in the reproduction color selection area 603, the reproduction color is provisionally placed into the selected state. In the present embodiment, the leftmost reproduction color candidate in each of the candidate groups 631 to 635 is in the selected state by default. In FIG. 6, the reproduction color candidates enclosed by a broken line are currently selected. In this example, for the fluorescent color (region B) that is the second region from the top, the reproduction color candidate displayed as the second button from the left in the candidate group 632 is currently selected as the reproduction color. In addition, for the fluorescent color (region D) that is the fourth region from the top, the reproduction color candidate displayed as the second button from the left in the candidate group 634 is currently selected as the reproduction color. In addition, for the fluorescent color (region E) that is the fifth region from the top, the reproduction color candidate that is the fifth button from the left in the candidate group 635 is currently selected as the reproduction color. With reference again to the flowchart shown in FIG. 5, when the user selects the "Enter" button 605 in this state (Step S505: YES), the respective reproduction colors provisionally selected are input to the reproduction color receiving section 405 as the reproduction colors for the corresponding fluorescent colors.

The reproduction color receiving section 405 inputs the reproduction colors received in the Step S504 to the fluorescent color reproducing section 406. In response to the input, the fluorescent color reproducing section 406 replaces the color information of each pixel extracted by the pixel extracting section 403 from the image data retained in the image retaining section 411 with a piece of color information specifying the corresponding one of the reproduction colors received by the reproduction color receiving section 405 (Step S506).

In the present embodiment, the reproduction color receiving section 405 prompts the user as to whether or not to register each reproduction color selected in Step S504 as a dealt reproduction color for the corresponding color range (Step S507). The prompt can be made through the display control section 404, for example.

Figure 7:
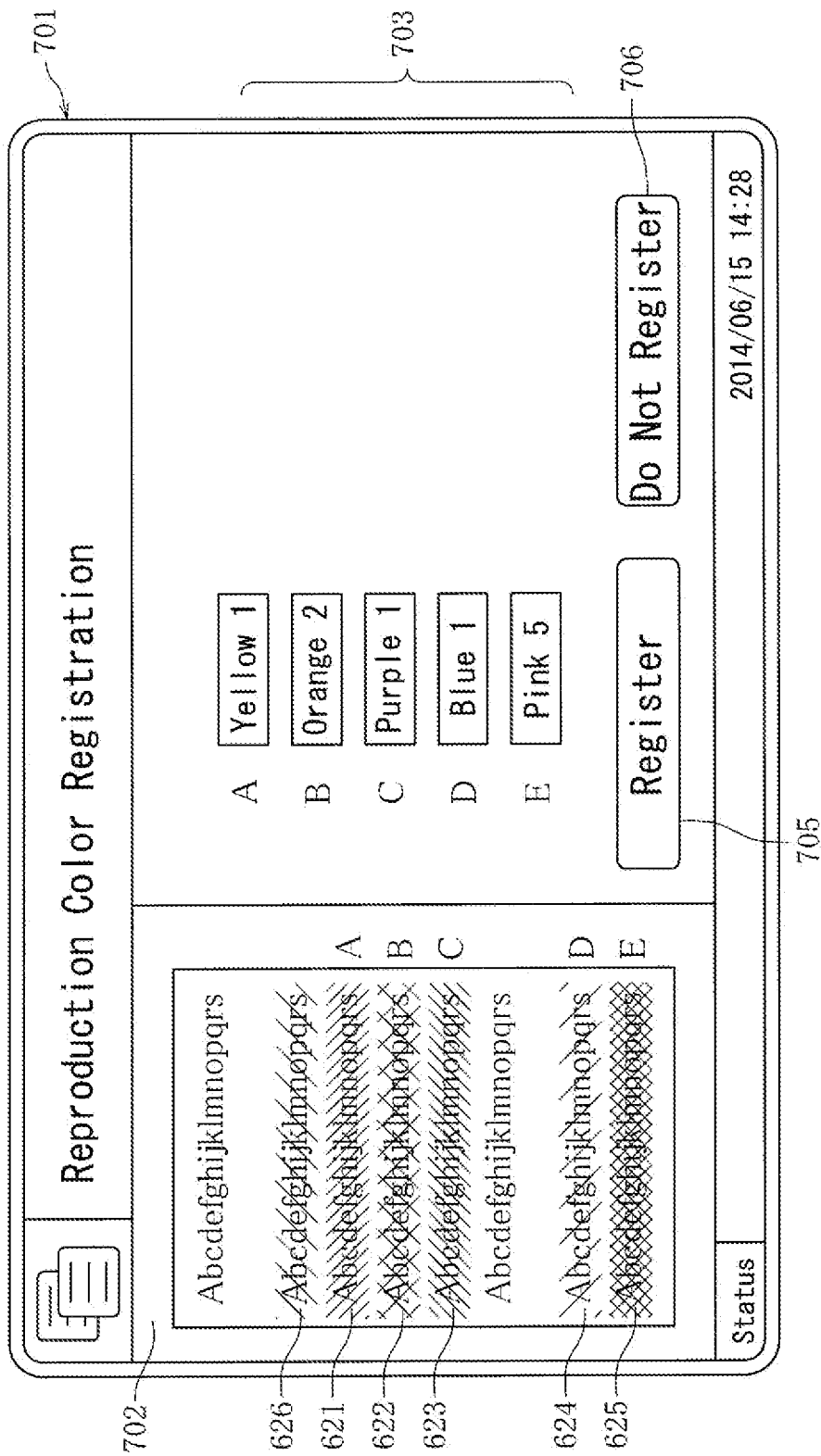
FIG. 7 shows one example of a reproduction color registration screen displayed by the multifunction peripheral shown in FIG. 1.

FIG. 7 shows one example of reproduction color registering screen 701 that is displayed on the display 201 in Step S507 of the flowchart shown in FIG. 5. In this example, the reproduction color selection screen 701 includes a detection result display area 702 and a registration color display area 703. The detection result display area 702 is used to display fluorescent colors detected by the pixel extracting section 403 from the image data. The registration color display area 703 displays the reproduction colors selected for the respective color ranges. The reproduction color selection screen 701 additionally includes a "Register" button and a "Do not register" button 706. The "Register" button 705 is used to register the selected reproduction colors as the default reproduction colors. The "Do not register" button 706 is used not to register the selected reproduction colors as the default reproduction colors. In this example, the registration color display area 703 displays "Yellow 1", "Orange 2", "Purple 1", "Blue 2", and "Pink 5" respectively as the reproduction colors selected for the region A (fluorescent yellow), the region B (fluorescent orange), the region C (fluorescent purple), the region D (fluorescent blue), and the region E (fluorescent pink).

As the flowchart of FIG. 5 shows, when the user selects the "Register" button 705 in this state (Step S507: Yes), the selected reproduction colors are registered as the default reproduction colors for the respective color ranges corresponding to the fluorescent colors (Step S508). In the present embodiment, information specifying the default reproduction colors is stored in the display control section 404. When displaying the reproduction color selection screen 601, the display control section 404 displays each default reproduction color at the leftmost position in the corresponding the candidate group in the reproduction color selection area 603.

On the other hand, when the user selects the "Do not register" button 706 on the reproduction color selection screen 701 (Step S507: No), the procedure ends without changing the currently registered default reproduction colors.

As has been described above, the multifunction peripheral 100 presents a plurality of reproduction colors for a pixel having a fluorescent color included in any of the color ranges designated in advance. The user can select any of the reproduction color candidates according to the preferences of the user. This prevents replacing a fluorescent color with a reproduction color not preferred by the user.

The following describes the "automatic region adjustment" displayed on the reproduction color selection screen 601. When the checkbox 607 is checked, the pixel extracting section 403 adjusts the image region to be reproduced in a designated reproduction color, based on the distribution information indicating where in the image text characters appear. More specifically, the pixel extracting section 403 extracts pixels having a fluorescent color and also extracts pixels determined based on the distribution information indicating the locations of the text characters appearing within the region in which the pixels extracted as having the fluorescent color are distributed.

Figure 8A:
FIGS. 8A and 8B illustrate one example of the adjustment of an image region reproduced in a reproduction color, by the multifunction peripheral shown in FIG. 1.
Figure 8B:

FIGS. 8A and 8B illustrate an example of the adjustment of an image region reproduced in a designated reproduction color. As shown in FIG. 8A, the image region displayed in a fluorescent color based on the image data does not fully cover the text characters. In this case, the pixel extracting section 403 determines a text character region 801 that is an image region enclosing the text characters and a fluorescent color region 802 that is an image region displayed in the fluorescent color included in the color range described above. Text characters may be recognized using a known scheme, such as optical character recognition (OCR). The image region enclosing the text characters can be determined based on, for example, the width and height of the text characters recognized. In addition, text characters spaced apart from one another may be recognized as a series of text characters on condition that the space is within a predetermine distance.

When the fluorescent color region 802 does not fully cover the text character region 801, the pixel extracting section 403 enlarges the fluorescent color region 802 in width and height to determine a rectangular region 803 that fully covers the text character region 801 and the fluorescent color region 802. This rectangular region 803 is extracted as an image region to be reproduced in the reproduction color. In this case, pixels corresponding to text characters have color information specifying the color of the text characters. Therefore, the pixel extracting section 403 extracts pixels not corresponding to the text characters from the pixels located in the text character region 801. The thus extracted pixels are subjected to the reproduction color replacement. In the present embodiment, when the checkbox 607 on the reproduction color selection screen 601 is checked to enable the automatic region adjustment, the detection result display area 602 displays the preview image of the image data with the fluorescent color region 802 and the rectangular region 803 as shown in FIG. 8B.

With this configuration, the multifunction peripheral 100 can apply an appropriate size adjustment to the image region occupied by the pixels extracted by the pixel extracting section 403 (that is, the image region of pixels subjected to the reproduction color replacement), in accordance with the height and the width of the text character region. Therefore, the present embodiment can ensure appropriate reproduction of a highlight line drawn in a fluorescent color on a document even if the highlight line has a faint (high brightness and high chromaticity) portion.

In the example described above, the fluorescent color region is adjusted by increasing the width and height to fully cover the text character region. Alternatively, the fluorescent color region may be adjusted by excluding a portion not covering the text character region from the image region subjected to the reproduction color replacement. In the example shown in FIG. 8B, a portion of the rectangular region 803 beyond the right edge of the text character region 801 may be excluded from the pixels subjected to the reproduction color replacement.

The following describes the "detection level change" displayed on the reproduction color selection screen 601. In the example shown in FIG. 6, the fluorescent color 626 included in the image data is not detected by the pixel extracting section 403 due to, for example, that the color is too faint (the brightness is too high). Consequently, the fluorescent color 626 included in a document may not be reproduced in print. To enable reproduction of more faint fluorescent colors, the user can select the "Detection Level Adjustment" button 604 to change the level of the fluorescent color detection.

Figure 9:
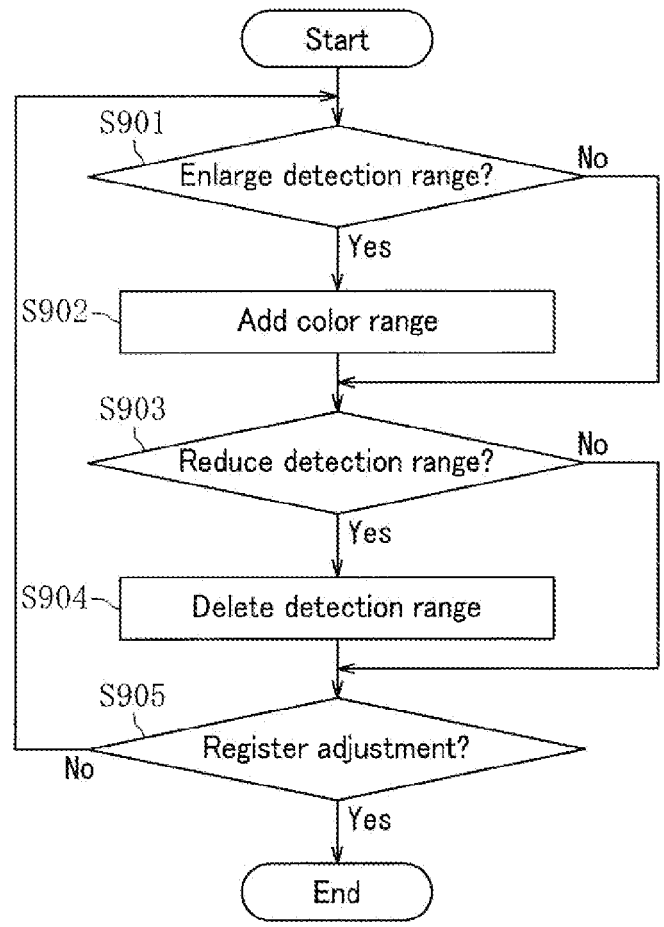
FIG. 9 is a flowchart of one example of a detection level adjustment procedure performed by the multifunction peripheral shown in FIG. 1.

FIG. 9 is a flowchart of one example of a detection color adjustment procedure performed by the multifunction peripheral 100. This procedure initiates in response the selection by the user of the "Detection Level Adjustment" button 604 on the reproduction color selection screen 601 shown in FIG. 6.

Figure 10:
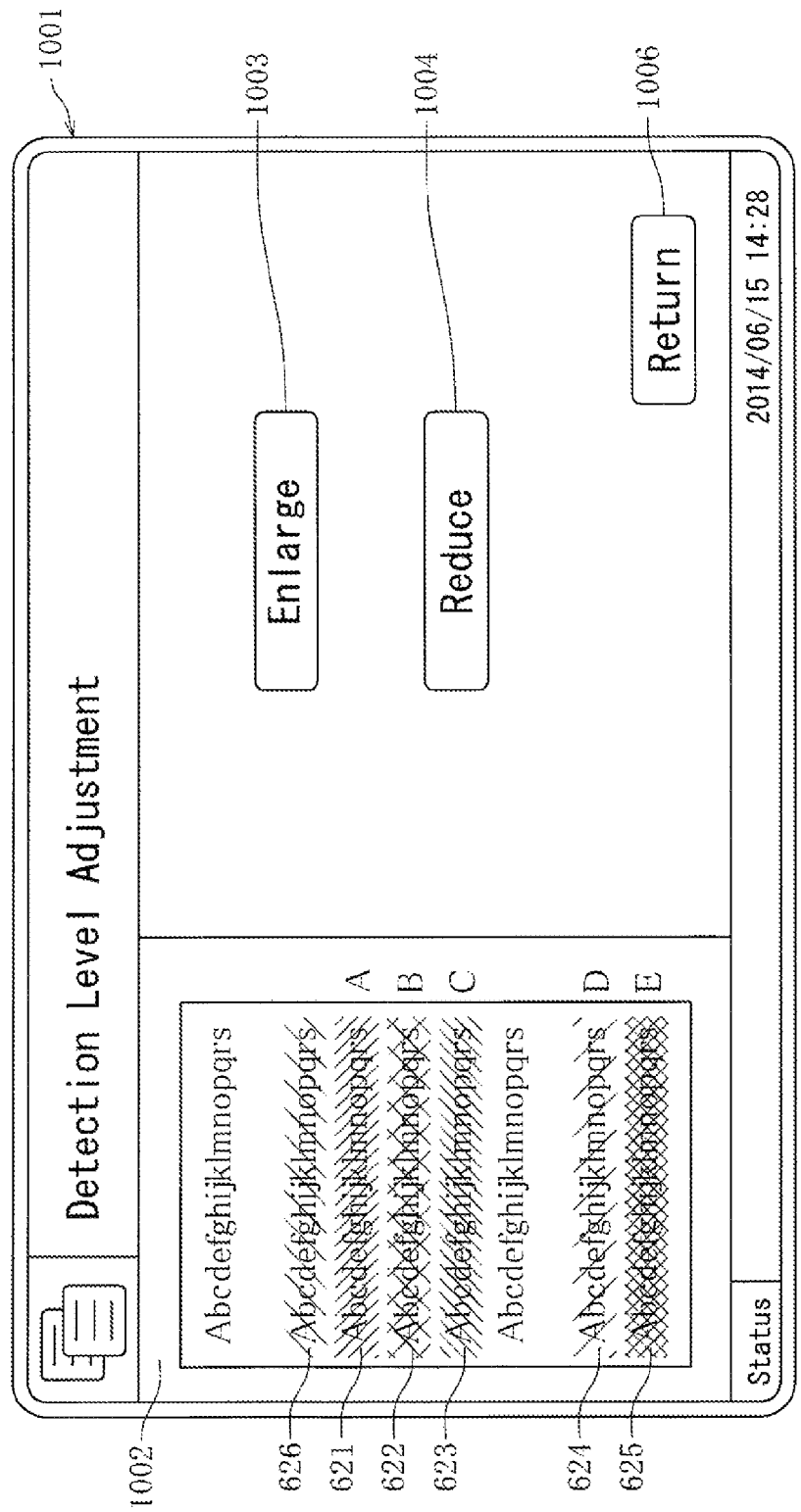
FIG. 10 shows one example of a detection level change screen displayed by the multifunction peripheral shown in FIG. 1.
Figure 11:
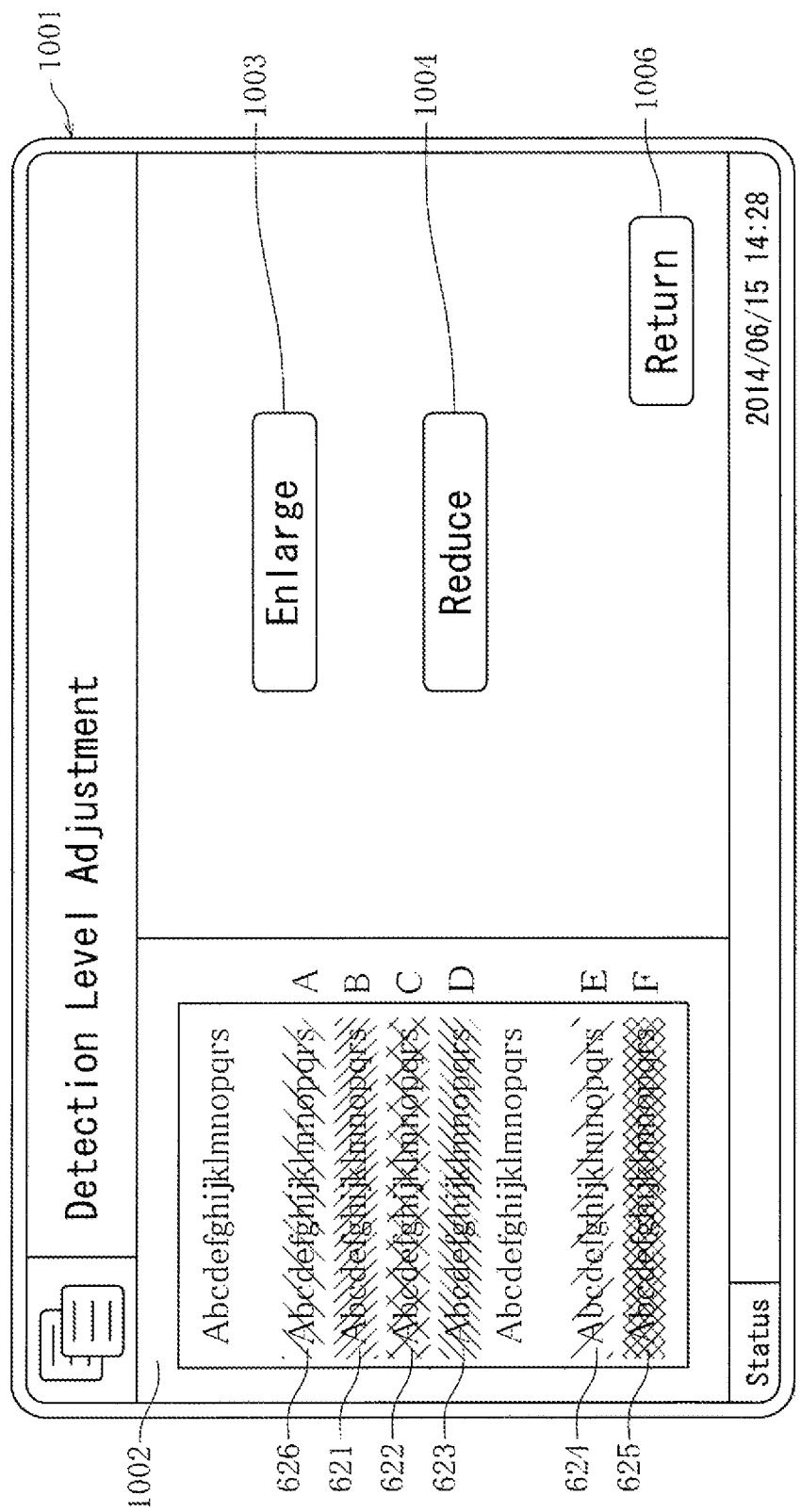
FIG. 11 shows another example of the detection level change screen displayed by the multifunction peripheral shown in FIG. 1.

FIG. 10 shows an example of a detection level adjustment screen 1001 presented on the display 201 by the detection level changing section 407 through the display control section 404. In this example, the detection level adjustment screen 1001 includes a detection result display area 1002, an "Enlarge" button 1003, a "Reduce" button 1004, and a "Return" button 1006. The detection result display area 1002 is used to display fluorescent colors detected by the pixel extracting section 403 from the image data. The "Enlarge"

button 1003 is used to enlarge the color ranges of the detectable fluorescent colors. The "Reduce" button 1004 is used to reduce the color ranges of the detectable fluorescent colors. The "Return" button 1006 is used to cancel the detection level adjustment and return to the reproduction color selection screen 601.

As the flowchart of FIG. 9 shows, the user selects the "Enlarge" button 1003 on the detection level adjustment screen 1001 (Step S901: Yes) to enable the detection of fluorescent colors more faint than the currently detectable fluorescent colors. In this case, the detection level changing section 407 adds a color range including a more faint fluorescent color to the color range list as described above (Step S902). In the present embodiment, the color range storing section 401 stores, for each of the fluorescent colors currently detectable, a color range including a more faint fluorescent color. Upon selection of the "Enlarge" button 1003 by the user, the detection level changing section 407 adds, for each of the fluorescent colors currently detectable, a color range including a more faint fluorescent color to the color range list. As a result of the addition of the color range corresponding to the more faint fluorescent colors, the pixel extracting section 403 additionally detects the fluorescent color 626 and the detection result display area 1002 on the detection level adjustment screen 1001 additionally shows the fluorescent color 626 as the region A.

In this state, when the user selects the "Reduce" button 1004 on the detection level adjustment screen 1001 (Step S903: Yes), the newly added color ranges are deleted from the color range list (Step S904). The detection level adjustment can be made in succession (Step S901) until the user selects the "Return" button 1006 (Step S905: No). When the user selects the "Return" button 1006 on the detection level adjustment screen 1001 (Step S905: Yes), the detection level adjustment as currently set is entered.

To enable detection of more intense fluorescent colors only, the user selects the "Reduce" button 1004 on the detection level adjustment screen 1001 (Step S901: No, and S903: Yes). In response, the detection level changing section 407 deletes the color ranges of the corresponding fluorescent colors from the color range list (Step S904). As a result, the pixel extracting section 403 is set to exclusively extract pixels of the more intense fluorescent colors.

The addition or deletion of color ranges to or from the color range list may be made collectively to all the fluorescent colors currently detectable as in the present embodiment. Alternatively, the addition or deletion may be made only with respect to one or more fluorescent colors of a specific hue.

This configuration of the present embodiment enables the adjustment of the detection level of fluorescent colors contained in the image data. Therefore, the user can selectively enable reproduction of specific one or more of the fluorescent colors contained in the image data and enable reproduction of fluorescent colors of higher brightness or chromaticity.

The multifunction peripheral 100 according to the present embodiment allows the user to add a fluorescent color targeted for detection. To enable addition of a detection target fluorescent color, the multifunction peripheral 100 includes a chromatic color detecting section 408, a registration color receiving section 409, and a registering section 410.

The chromatic color detecting section 408 detects chromatic colors from the image data. In the present embodiment, the chromatic color detecting section 408 detects chromatic colors from the image data retained in the image retaining section 411. In the present embodiment, the chromatic color detecting section 408 is set to detect one or more colors each having high chromaticity and high brightness.

The registration color receiving section 409 receives a chromatic color selected by the user from among the one or more chromatic colors detected by the chromatic color detecting section 408. The selection is input on the operation panel 200, for example. In the present embodiment, the registration color receiving section 409 receives a chromatic color selected by the user on the touch sensitive display 201.

Based on the color information specifying the chromatic color received by the registration color receiving section 409, the registering section 410 newly registers a color range that matches the color information into the color range storing section 401. In addition to receiving the selection of a chromatic color, the registration color receiving section 409 may receive color information to be stored into the reproduction color storing section 402 in association with the chromatic color.

Figure 12:
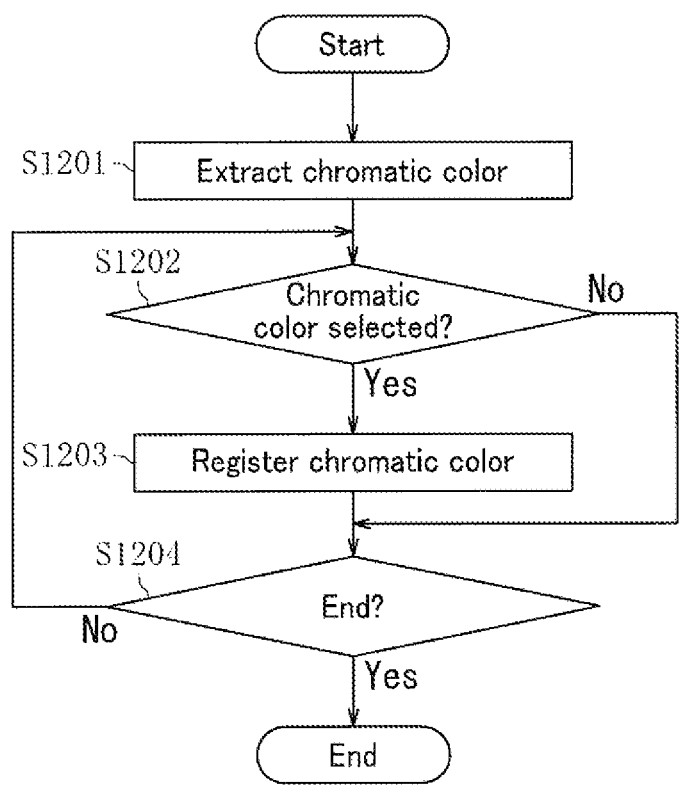
FIG. 12 is a flowchart of one example of a fluorescent color registration procedure performed by the multifunction peripheral shown in FIG. 1.

FIG. 12 is a flowchart of one example of the fluorescent color registration procedure performed by the multifunction peripheral 100. The procedure initiates in response to user's input made on the operation panel 200 for instructing execution of the fluorescent color registration.

Once the procedure initiates, the chromatic color detecting section 408 detects, from the image data retained in the image retaining section 411, pixels having a high chromaticity and high brightness designated in advance (Step S1201). The chromatic color detecting section 408 presents each detected chromatic color on the display 201 and waits until the user completes the selection (Step S1202: No, and S1204: No).

Figure 13:
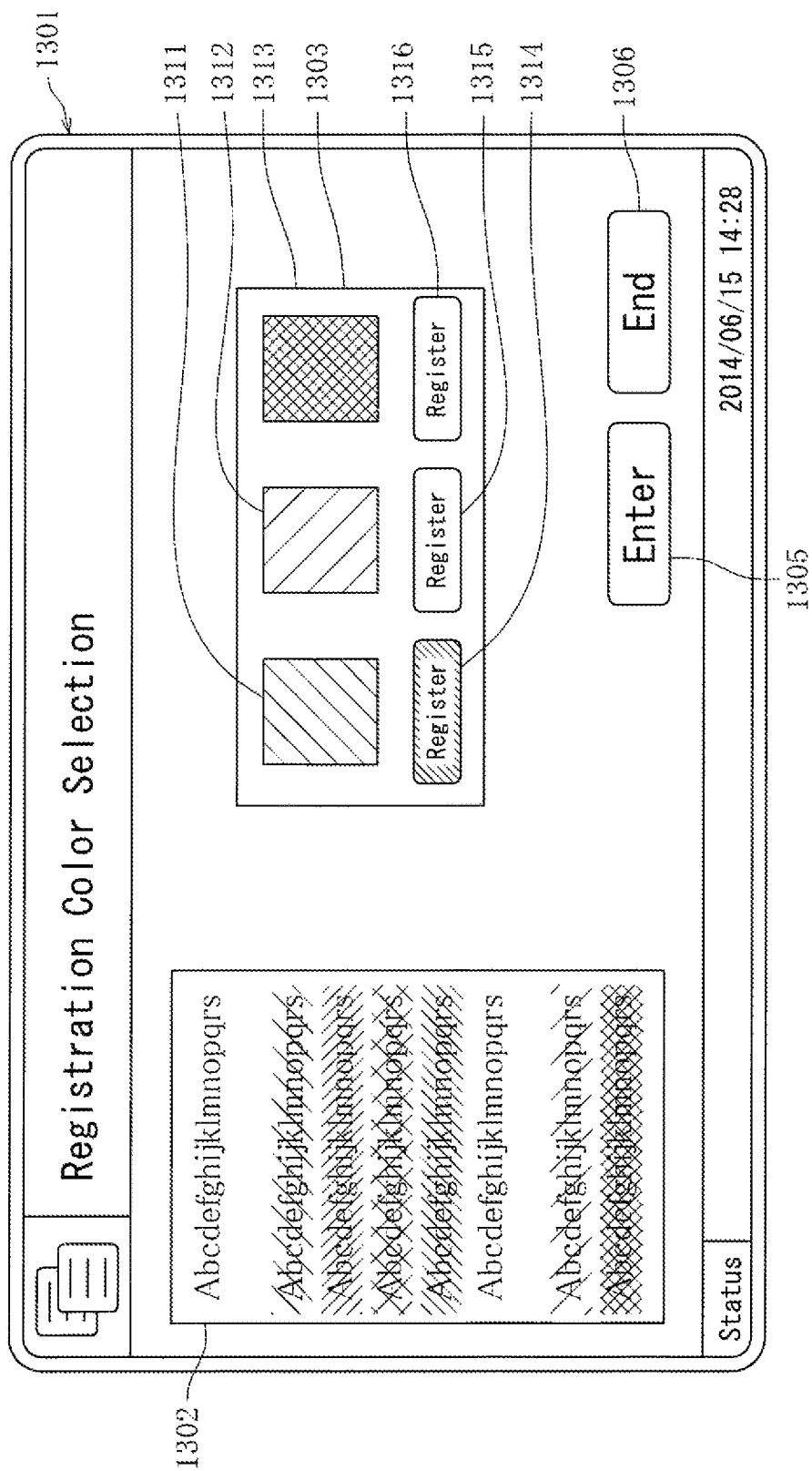
FIG. 13 shows an example of a registration color selection screen displayed by the multifunction peripheral shown in FIG. 1.

FIG. 13 shows one example of a registration color selection screen 1301 presented on the display 201. In this example, the registration color selection screen 1301 includes a detection result display area 1302, a registration color selecting section 1303, an "Enter" button 1305, and an "End" button 1306. The detection result display area 1302 displays, as registration color candidates, the chromatic colors detected by the chromatic color detecting section 408 from the image data. In addition to displaying the registration color candidates, the registration color selecting section 1303 receives user's input selecting a registration color. The "Enter" button 1305 is used to enter the user's selection. The "End" button 1306 is used to end the selection procedure.

The registration color selection screen 1301 displays in the registration color selecting section 1303 three chromatic colors in decreasing order of brightness, for example, from among the chromatic colors detected by the chromatic color detecting section 408. The registration color selecting section 1303 includes rectangular images 1311, 1312, and 1313 and "Register" buttons 1314, 1315, and 1316. The rectangular images 1311, 1312, and 1313 are presented in the colors of the respective registration color candidates. The "Register" buttons 1314, 1315, and 1316 are each used to select the chromatic color of the corresponding rectangular image. In this example, the "Register" button 1314 displayed at the left within the registration color selecting section 1303 is in the selected state; the Register" button 1314 corresponds to the rectangular image 1311 presented in the color of the corresponding registration color candidate.

As the flowchart of FIG. 12 shows, when the user selects the "Enter" button 1305 in this state (Step S1202: Yes), the registration color receiving section 409 inputs pieces of color information each specifying a chromatic color selected by the user to the registering section 410 (Step S1203). In response to the input, the registering section 410 registers the received pieces of color information into the color range storing section 401, in addition to the corresponding dolor difference (for example, $\Delta E^*ab=5$) registered in advance in the registering section 410 (Step S1203). Here, the reproduction color to be associated with a newly registered color range may be selected by the user on, for example, a color palette presented on the display 201. The reproduction color to be associated with a newly registered color range may be selected after the registration by the color range storing section 401.

In the present embodiment, when a chromatic color presented on the registration color selecting section 1303 is registered into the color range storing section 401, the registration color receiving section 409 notifies the chromatic color detecting section 408 of the registration (see FIG. 4). Upon receipt of the notification, the chromatic color detecting section 408 deletes the registered chromatic color displayed in the registration color selecting section 1303 and presents another registration color candidate in the registration color selecting section 1303.

In the present embodiment, as the flowchart of FIG. 12 shows, the selection of a registration color can be made in succession until the user selects the "End" button 1306 (Step S1204: No). When the user selects the "End" button 1306 on the registration color selection screen 1301, the fluorescent color registration procedure ends (Step S1204: Yes).

As has been described above, the multifunction peripheral 100 allows the user to additionally register a new color range by using image data, when a desired fluorescent color included in the image data is not detected.

In the description given above, the chromatic color detecting section 408 selects a registration color candidate to be displayed. A chromatic color to be registered into the color range storing section 401 may be selected on a preview image displayed in the detection result display area 1302. More specifically, the selection can be made by a touch with, for example, a user's finger on a point corresponding to a desired chromatic color.

As has been described above, the present disclosure is capable of reproducing fluorescent colors included in image data, as intended by the user.

The embodiment and alterations described above should not be construed as limiting the technical scope of the present disclosure. Various other alterations and applications may be made within the scope of the present disclosure. For example, the embodiment above is described in terms of operations made on the operation panel of the multifunction peripheral. However, the multifunction peripheral may be operated via an information processing terminal connected to the multifunction peripheral to enable communications. In this alteration, the functions of the operation panel 200 of the display 201 described in the above embodiment are implemented by components of the information processing terminal, namely a display section, such as a display, and an input section, such as a keyboard.

In the embodiment above, the multifunction peripheral 100 described as having a preferred configuration is provided with the functions of selecting reproduction colors and adjusting fluorescent color detection level. However, the multifunction peripheral 100 may be provided only with either the function of selecting reproduction colors or the function of adjusting fluorescent color detection level. In addition, the function of newly registering a fluorescent color is not an essential component of the present disclosure. The present disclosure may adopt a configuration not having the function of newly registering a fluorescent color.

The flowcharts shown in FIGS. 5, 9, and 12 may be appropriately altered in the order of steps, within the scope of producing the same or corresponding effect. For example, in FIG. 5, the multifunction peripheral 100 receives input instructing execution of the fluorescent color mode and then designates image data. However, the multifunction peripheral 100 may designate the image data and then receive input of an instruction to execute the fluorescent color mode.

In addition, although the embodiment described above is directed to a digital multifunction peripheral, the present disclosure is not limited to a digital multifunction peripheral and applicable to any image processing devices, such as printers and copiers.

What is claimed is:

1. An image processing device that detects a fluorescent color from image data and replaces the fluorescent color with a designated color, the image processing device comprising:
   a color range storing section that stores a color range including a fluorescent color targeted for detection;
   a reproduction color storing section that stores, in association with the color range, a plurality of pieces of color information each specifying a reproduction color candidate usable for reproducing the fluorescent color included in the color range;
   a pixel extracting section that extracts from the image data a pixel having the fluorescent color based on the color range stored in the color range storing section;
   a display control section that
      reads, from the reproduction color storing section, the plurality of pieces of color information corresponding to the fluorescent color of the pixel extracted by the pixel extracting section and
      displays the reproduction color candidates specified by the respective read pieces of color information on a display section;
   a reproduction color receiving section that receives a reproduction color selected by a user from among the plurality of reproduction color candidates displayed on the display section; and
   a fluorescent color reproducing section that replaces color information of the pixel extracted by the pixel extracting section with color information specifying the reproduction color received by the reproduction color receiving section, wherein
   the pixel extracting section extracts, from the image data, pixels each having the fluorescent color and extracts pixels included in a text character region, the text character region being an image region enclosing a text character,
   the text character is located within a fluorescent color region, the fluorescent color region being an image region in which the pixels extracted as having the fluorescent color are distributed, and
   when the fluorescent color region does not fully cover the text character region, the pixel extracting section enlarges the fluorescent color region in width and height so as to fully cover the text character region.

2. The image processing device according to claim 1, wherein
   the color range storing section stores a plurality of color ranges that are adjacent to one another in a color space,
   the image processing device further comprising
   a detection level changing section that changes the color range of the fluorescent color targeted for detection by selecting, from among the color ranges stored in the color range storing section, a color range to be used for the pixel extraction by the pixel extracting section.

3. The image processing device according to claim 1, wherein
   the pixel extracting section determines the text character region based on a width and a height of the text character.

4. The image processing device according to claim 1, wherein the image processing device sets the reproduction color received by the reproduction color receiving section as a default reproduction color associated with the color range of the fluorescent color to be replaced with the reproduction color.

* * * * *